United States Patent
Ernst

[15] 3,653,697
[45] Apr. 4, 1972

[54] PREFABRICATED JOINT

[72] Inventor: Herbert Ernst, Wartbergsteige 109, 71 Heilbronn, Germany

[22] Filed: Aug. 12, 1969

[21] Appl. No.: 849,416

[30] Foreign Application Priority Data

Aug. 16, 1968 Germany .................. P 17 84 553.9

[52] U.S. Cl. .................................................. 287/56, 182/228
[51] Int. Cl. ............................................................ F16b 7/00
[58] Field of Search .............. 287/56, 54 C; 285/189, 192; 182/228; 256/65

[56] References Cited

UNITED STATES PATENTS

| 2,179,089 | 11/1939 | Hauf | 285/189 |
|---|---|---|---|
| 2,594,561 | 4/1952 | Hauck | 285/192 X |
| 2,846,241 | 8/1958 | McDonnell et al. | 287/54 C X |
| 3,168,938 | 2/1965 | Shaver | 182/228 |
| 3,243,051 | 3/1966 | Ruhnke | 287/56 X |
| 3,318,413 | 5/1967 | Werner et al. | 287/56 X |
| 3,427,056 | 2/1969 | Cunningham | 287/54 C |
| 2,575,965 | 11/1951 | Malm | 285/191 |
| 2,876,740 | 3/1959 | Melas | 285/192 X |

FOREIGN PATENTS OR APPLICATIONS

| 175,157 | 2/1922 | Great Britain | 182/228 |
|---|---|---|---|
| 1,012,082 | 4/1952 | France | 182/228 |
| 777,968 | 7/1957 | Great Britain | 182/228 |
| 1,067,679 | 5/1967 | Great Britain | 182/228 |
| 1,120,035 | 7/1968 | Great Britain | 182/228 |
| 1,067,330 | 1/1954 | France | 285/192 |

*Primary Examiner*—Andrew V. Kundrat
*Attorney*—Karl F. Ross

[57] ABSTRACT

A joint for connecting two or more structural elements at an angle to each other. At least a first of these elements is of a tubular shape, preferably of a rectangular cross section, and provided with an aperture in its wall through which the end of a second element is inserted so as to abut directly or indirectly against the inside of the wall of the first element at a point opposite the aperture where the inserted end of the second element is additionally secured either directly or indirectly to the wall of the first element. The two elements may either be welded directly to each other or be interconnected by an additional supporting member which may be inserted into and welded to the first element and then braces the opposite wall portions of the latter against each other. This supporting member forms a socket into which the end of the second element may be inserted.

11 Claims, 14 Drawing Figures

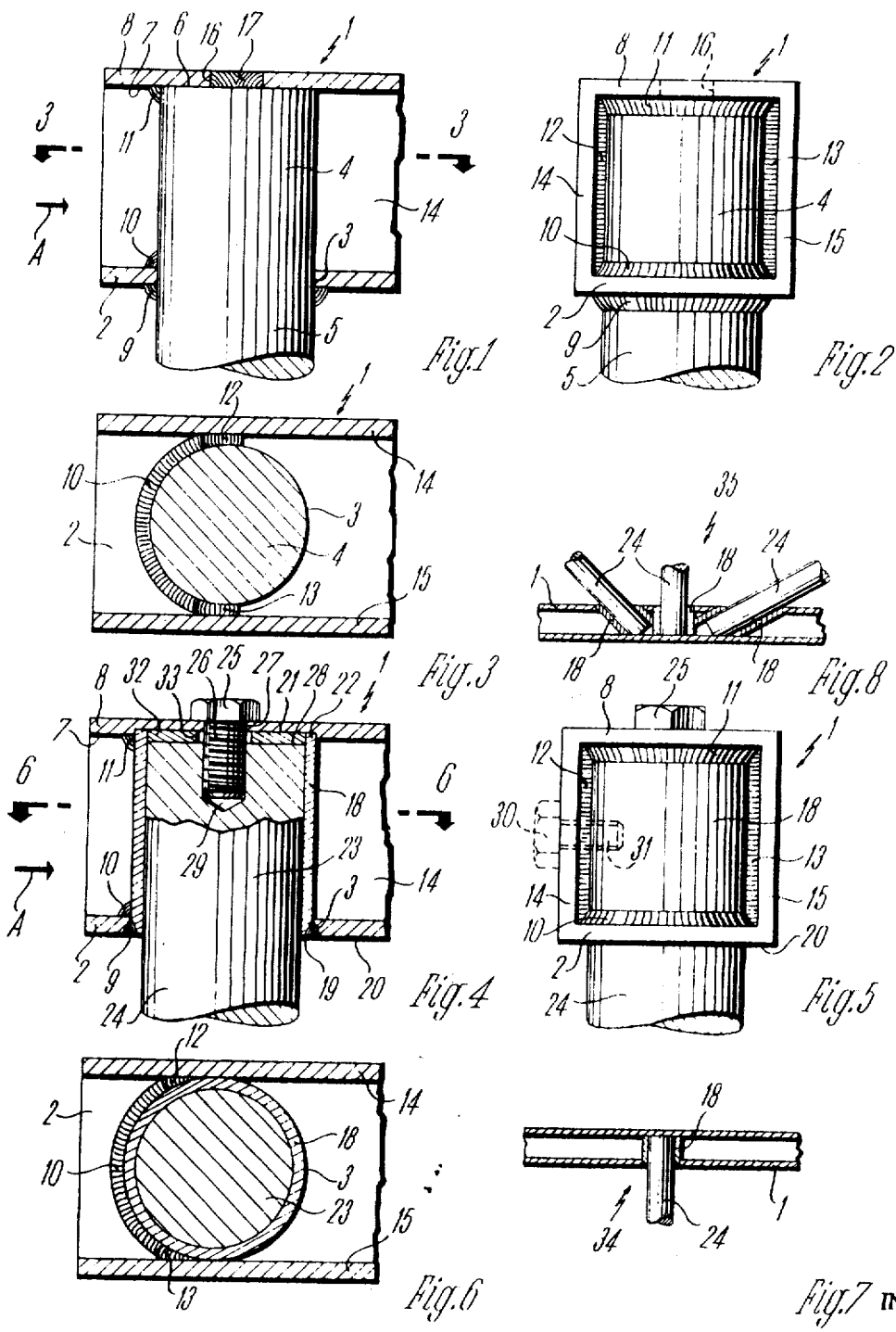

PREFABRICATED JOINT

The present invention relates to a prefabricated joint for interconnecting two or more structural elements which preferably consist of steel and are disposed at an angle to one another.

Such structural elements, especially those of a tubular shape, are generally connected at any desired angle to each other by butt joints and by welding these joints. The welds which are then formed must be capable of taking up and further transmitting the forces to which these elements are subjected. Although such welded joints generally satisfy these requirements if the forces occurring consist only of tensile or bending stresses, they are often too weak if they are also required to transmit torsional stresses from one element to the other. In order to overcome these difficulties and to solidify the desired connections, additional so-called flange plates are frequently employed which also have to be welded to the structural elements which are to be connected to each other.

It is an object of the present invention to provide a prefabricated joint of the type described above which overcomes the last-mentioned difficulties and may be designed so as to take up and transmit tensile and bending stresses and, if required, also torsional stresses without being additionally reinforced by flange plates or similar means.

According to the invention this object is attained by giving to a first of at least two elements of a structural unit a tubular shape, inserting one end of the second element which may be of any desired cross-sectional shape into the first element through a corresponding aperture in the wall of the latter, and welding, screwing or otherwise connecting the two elements to each other within the area in which the greatest stresses may occur so that forces may be transmitted positively and without friction from one of the elements to the other.

At first glance it may appear to be without sense to weaken the wall of the tubular element by an aperture and then to fill out this aperture again by inserting therein the other element and to weld the two elements together or to connect them to each other in any other suitable manner. However, the original weakening of the tubular element which was caused by cutting the aperture in its wall is compensated by filling out this aperture by means of the other element which projects into the tubular element and is adapted to take up the stresses which are transmitted from the latter. This projecting part of the second element is disposed entirely within the tubular element and the latter may therefore have entirely smooth outer surfaces which are not interrupted by any projections or the like. This type of construction also permits the welds to be disposed within the areas in which the greatest stresses will occur, and these welds may then extend not only in the direction of one centroidal axis, i.e. the X-axis, but also in the direction of the Y-axis at a right angle to the X-axis so that the welds will then produce the desired torsional stability of the joint. Aside from securing the two elements to each other by these welds, the insertion of the end of the second element into the tubular element also produces the result that any bending stresses which are exerted upon one element or the other will produce a strong clamping effect between the two elements which additionally solidifies the joint between them.

Such structural units which may be adequately resistant not only to tensile and bending stresses but also to torsional stresses may consist of steel, plastic, or any other suitable material and may be employed for connecting various structures to each other as, for example, lattice girders or angularly extending girders. The horizontal and vertical elements of these units may also be made of different cross-sectional shapes in accordance with the stresses which they are to take up and transmit to each other and such units may be employed generally in building any structures above or below ground or in building factories, apartment houses or private houses. The connection of two prefabricated structural elements in accordance with the invention is also especially of importance for plugging together the individual struts, spars or girders of frame structures, grandstands or the like. The same also applies to the connection of the vertical and horizontal elements for building balconies, overpasses or the like and for assembling the elements of prefabricated staircases in accordance with my copending U.S. application Ser. No. 613,494, filed on Feb. 2, 1967, now Pat. No. 3,474,882.

According to one very advantageous embodiment of the invention, the tubular first element of the structural unit is made of a rectangular or square cross section, while the second element is rod-shaped and of either solid or tubular circular cross section. One end of this rod-shaped second element extends into the first element through a bore of the same diameter in one side wall of the latter and through this first element up to the inner surface of the opposite side wall, and the two elements are secured to each other by one or more welds which extend at least partly around the outer surface of the rod-shaped element at the outer and/or inner surface of the side wall containing the bore and around the same and preferably also at the inner surface of the opposite wall of the tubular first element. The use of such a second element in the form of a solid or tubular rod insures that any forces which are exerted upon one of the elements will be uniformly transmitted to the other element. The two elements, at least of this embodiment of the invention, may be additionally secured to each other by welds which extend in the axial direction along the inserted end of the rod and across the inner sides of the two other side walls of the tubular element.

If this rod is solid, a connecting tube may be slipped over its end which projects from the tubular first element, or if it is tubular, a connecting rod may be slipped into this tube. While this connecting tube or connecting rod will at least initially be rotatable on or in the inserted rod or tube, it may also be rigidly secured thereto by any suitable means. In this manner it is also possible to interconnect several structural elements or units of any kind by a simple plug joint which may be rigidly locked so as also to be torsion-resistant or also be designed, if desired, so as to be easily severed.

When employing such a connecting tube which extends into the tubular first element through the bore in one wall thereof, one end of this tube should abut against the inner side of the opposite wall, while its other end should be flush with the outer side of the tubular element and of the bore therein. At least the two ends of this tube should also be rigidly secured to the walls of the tubular element, preferably by welding. This tube then forms a socket within the tubular element in which the end of a connecting rod or a connecting tube may be mounted. The outer weld between the outer end of this socket and the wall of the tubular element containing the bore may be countersunk into this bore so that the outer surface of this wall will be entirely smooth around the connecting rod or connecting tube when mounted in the socket.

Instead of forming a complete socket by extending up to the wall of the tubular first element opposite its wall containing the bore, the tube may also project only for a certain distance from the wall containing the bore into the tubular element so as to encompass only a part of the inserted end of the rod or connecting tube. The opposite wall of the tubular element should then be provided with suitable means for securing the free end of the rod or connecting tube in a fixed central position relative to the bore and the tubular part projecting inwardly from this bore. This tubular part as well as the centering means may be integral with the wall containing the bore and the opposite wall, respectively. This may be attained, for example, by bending the wall portion adjacent to and around the bore toward the inside of the tubular element so as to form a tubular projection of an inner diameter corresponding to the outer diameter of the rod or connecting tube and by also bending a part of the opposite wall toward the inside of the tubular element so as to form a centering abutment which is adapted to engage in a recess of a corresponding shape in the free end of that link. These inwardly projecting parts of the two opposite walls are produced by a deep-drawing operation.

In place of or in combination with the mentioned inner projections on the two opposite walls of the tubular element, the latter may also be provided with a bracing insert which, instead of being inserted into the tubular element through the bore like the bracing tube as previously mentioned which then requires this bore to be of a larger size, may be inserted laterally through the open end of the tubular element so that the opposite end surfaces of this insert then abut against the inner sides of the two opposite walls of this element and brace these walls against each other regardless of whether or not these ends of the insert are positively secured to these walls by welding. This insert may be tubular, so that together with the wall of the first element opposite that containing the bore it forms a socket for receiving the end of the rod or connecting tube, or it may itself form a socket by being provided with a socket hole in the side facing the bore and extending coaxially thereto. This bracing insert may be welded together with the tubular element in a manner similar to previously described with reference to the bracing tube. It may, however, also be clamped between the opposite walls of the tubular element or be glued into the latter.

If the tubular element is to be provided with the inward projections to serve as a tubular projection on one wall and a centering abutment on the opposite wall, these projections are, of course, to be formed after the bracing insert has been brought into its proper position in the tubular element. They may then be formed by a single operation in which the opposite walls of the tubular element may also be pressed toward each other so as to clamp the bracing insert between them. This bracing insert may also have integrally thereon a cover plate for closing the open end of the tubular element. This insert is then preferably made of cast iron.

These as well as additional features of the invention will become further apparent from the following detailed description thereof which is to be read with reference to the accompanying drawing in which:

FIG. 1 shows a longitudinal section of a joint of two structural elements according to a first embodiment of the invention;

FIG. 2 shows a side view of the same joint, as seen in the direction of the arrow A in FIG. 1;

FIG. 3 shows a cross section which is taken along the line 3—3 in FIG. 1;

FIGS. 4 to 6 show three views similar to those according to FIGS. 1 to 3, respectively, of a joint according to a second embodiment of the invention;

FIGS. 7 and 8 illustrate diagrammatically in longitudinal section two different ways in which the joints according to the invention may be applied;

FIG. 12 shows a longitudinal section of a joint similar to that shown in FIG. 10 but provided with an additional bracing tube; while

Figure 9:
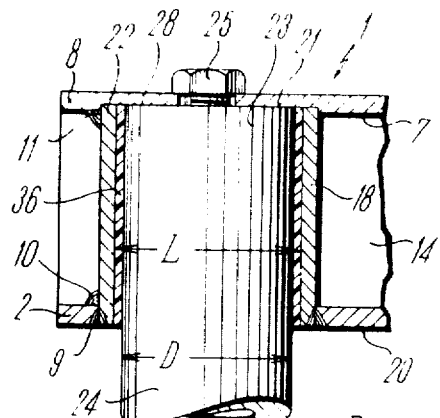
FIGS. 9 and 10 show longitudinal sections, similar to FIGS. 1 and 4 of two further embodiments of the invention.

The prefabricated joint according to the first embodiment of the invention as shown in FIGS. 1 to 3 forms a solid connection of a tubular first element 1 of a square cross section with a second element 5 in the form of a solid connecting rod or the like. One end 4 of this rod 5 is inserted through a bore 3 in one wall 2 of the first element 1 so that the end surface 6 of rod 5 abuts against the inner surface 7 of the opposite wall 8 of the tubular element 1. These two elements 1 and 5, both of which preferably consist of steel, are secured to each other primarily by a weld 9 which extends around the entire periphery of rod 5 on the outer side of wall 2. In addition, the elements 1 and 5 are secured to each other by semicircular welds 10 and 11, as shown particularly in FIGS. 2 and 3, which extend partly around the outer surface of rod 5 and along the inner surfaces of walls 2 and 8, and further by two diametrically opposite weblike welds 12 and 13 which extend in the axial direction along the outer surface of rod 5 and along the inner surfaces of the two other side walls 14 and 15 of the tubular element 1. If these three different welds should still not secure the two elements 1 and 5 sufficiently to each other, the wall 8 of the tubular element may also be provided with a bore 16 which may be filled out with a weld 17 to secure the wall 8 further to the end surface of rod 5.

In the joint illustrated in FIGS. 4 to 6 a supporting or bracing tube 18 which preferably also consists of steel is inserted through the bore 3 into the square tubular element 1 so that its outer end surface 19 is flush with the outer side 20 of wall 2 of the tubular element 1. The inner side 7 of the opposite wall 8 of the element 1 is further provided with a cylindrical recess 21 which has the same diameter as bore 3 and into which the end 22 of the bracing tube 18 extends so as to abut against the bottom of recess 21. This recess 21, which forms a secure seat for the bracing tube 18, and the bore 3 in the wall 2 of the square tubular element 1 are preferably produced consecutively by one operation and with the same tool. In order to prevent the weld 9 from projecting over the outer side 20 of the wall 2 of the element 1, this weld is countersunk into the outer side 20 in the manner shown in FIG. 4. If it is not required to render the joint more secure, this weld 19 may also be omitted.

The bracing tube 18, which together with the wall 8 forms a socket within the square element 1, serves for receiving one end 23 of a connecting rod 24 or the like whose other end may engage, for example, to the bracing tube 18 of another structural unit of the same kind.

The end of rod 24 which at first is slidable in its longitudinal direction in the bracing tube 18 may be secured therein in a fixed position by means of a screw 25 whose threaded shank 26 is inserted through a bore 27 in the wall 8 of the element 1 and is screwed into a tapped bore 29 which extends axially into the end 23 of rod 24. If it is desirable or necessary to adjust the connecting rod 24 in its longitudinal direction relative to the element 1, one or more spacing washers 32 with a central bore 33 for the insertion of screw 26 may be interposed between the end surface 28 of rod 24 and the bottom of the recess 21 in the wall 8 of the element 1. The connection may be strengthened by a further screw 30 threaded laterally into a tapped bore 31 of rod 24.

FIGS. 7 and 8 illustrate diagrammatically two different ways in which the joint according to the invention may be employed. While according to FIG. 7 is may be used to form a simple T-shaped joint whose two main elements 1 and 24 may be plugged at right angles into each other, it is designed according to FIG. 8 so as to form a connecting element 35 of a plurality of connecting rods 24 which are disposed at different angles to the element 1 in which they are mounted in supporting tubes 18 secured to this element 1 in the manner previously described.

FIG. 9 illustrates an embodiment of the invention which is similar to that as shown in FIGS. 4 to 6 but comprises a connecting rod 24 of tubular shape. In addition, the structural unit according to FIG. 9 is provided with a spacing tube 36, preferably of plastic, which is inserted into the supporting or bracing tube 18 for compensating a difference between the inner width L of tube 36 and the outer diameter D of the end 23 of rod 24.

Figure 10:
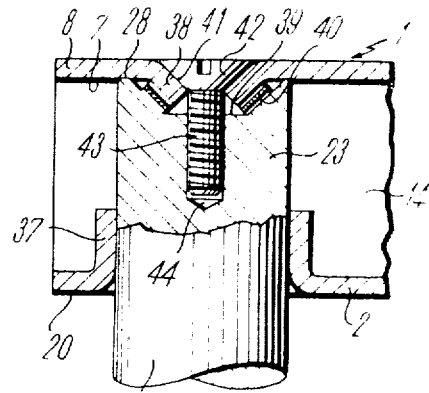

FIG. 10 illustrates another embodiment of the invention in which the side wall 2, instead of being connected by a tube 18 to the opposite wall 8, has integrally formed thereon a tubular part or collar 37 which extends for a considerable distance toward the opposite wall 8 and is produced by a deep-drawing process, while the wall 8 is provided with a conical bearing part or boss 38 which is likewise produced by deep-drawing and engages in a similar conical recess 39 in the end surface 28 of rod 24. If desired, the opposite conical surfaces of the bearing part 38 and the recess 39 may also be spaced sufficiently from each other so as to permit a conical serrated washer 40 to be inserted which is provided on both sides with radially projecting teeth exerting a frictional clamping action upon the adjoining conical surfaces when a clamping screw 42 is tightened. The head of this screw is countersunk into the outer side 41 of the bearing part 38 and the screw shank 43 engages in a tapped bore 44 in the end 23 of rod 24.

Figure 11:
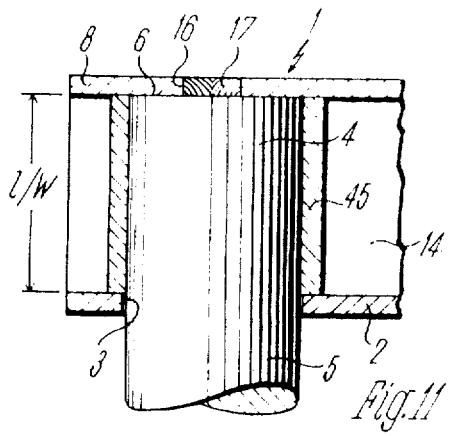
FIG. 11 shows a longitudinal section of a joint similar to that shown in FIG. 1 but provided with a bracing tube at the inside of the tubular structural element.

FIG. 11 illustrates a modification of the joint shown in FIGS. 1 to 3, in which the rectangular element 1 is reinforced by a separate supporting or bracing tube 45 which has a length *l* equal to the width W of the clearance between the opposite walls 2 and 8 of the element 1 and which may be inserted into the latter from its open left side. This tube 45, which, if desired, may also be welded to the walls of the element 1, forms a socket into which the end 4 of the connecting rod 5 may be inserted and it transmits the forces exerted thereon either to the element 1 or to the rod 5. This joint has the advantage over that shown in FIGS. 4 to 6 that, since the supporting tube 45 may be inserted into the element 1 from the open end thereof rather than through the bore 3 in the wall 2, this bore has to be made only of a diameter equal to that of the rod 5 and the wall 2 therefore does not have to be weakened unnecessarily.

Figure 12:
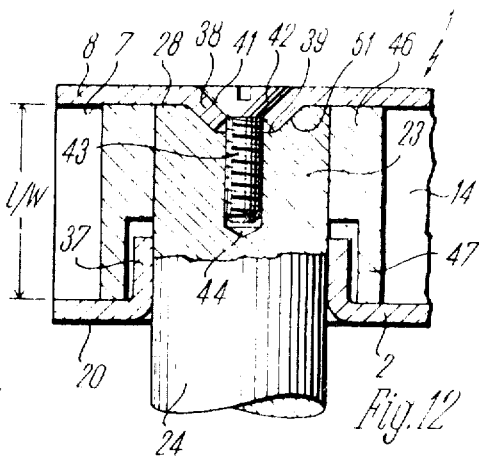

The joint illustrated in FIG. 12 is similar to that shown in FIG. 10 but additionally provided with a supporting or bracing tube 46. While a considerable part of this supporting tube or spacer 46 adjacent to the wall 8 of the element 1 has an inner diameter which substantially corresponds to the diameter of the inserted end part 23 of the connecting rod 24, the other part 47 of this tube has a larger inner diameter so as to enclose the tubular part 37 which is bent inwardly from the wall 2 of element 1. However, in order to permit the supporting tube 46 to be inserted into the element 1 from the open side thereof to the position as shown in FIG. 12, this tube is shifted to this position while the walls 2 and 8 of element 1 are still flat, that is, before they are bent inwardly so as to form the tubular part 37 and the conical bearing part 38. Owing to the pressure which is exerted upon the walls 2 and 8 when the parts 37 and 38 are bent inwardly, these two walls will also be slightly deformed so as to clamp the tube 46 firmly between them.

Figure 13:
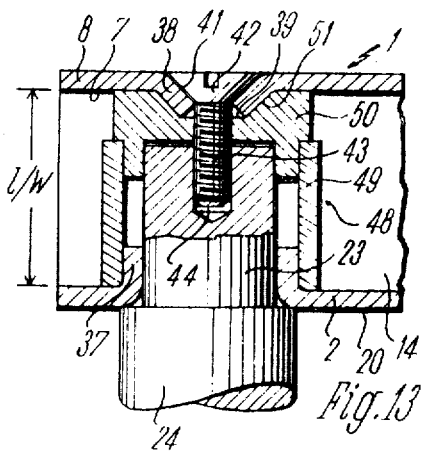
FIGS. 13 and 14 show longitudinal sections of two further embodiments of the invention which are similar to the embodiment shown in FIG. 12 but are provided with different bracing elements.

FIG. 13 illustrates a further modification in which the supporting tube 48 is divided into two parts, i.e. a tubular part 49 and a bearing part 50 which projects into this tubular part and is provided with a recess 51 of a shape conforming to the conical bearing part 38 of wall 8.

Figure 14:
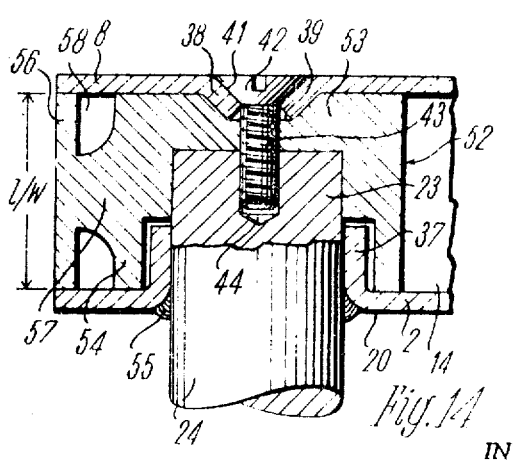

FIG. 14 finally illustrates a supporting or bracing member 52 which is preferably made of cast iron and is provided with a bearing part 53 for receiving the conical part 38 of wall 8 and with an opposite bearing part 54 for receiving the tubular part 37. These two bearing parts are of a sufficient solidity to permit the conical part 38 and the tubular part 37 to be properly formed after the supporting member 52 has been inserted into the position shown in FIG. 14. The very effective transmission of forces from one element of this structural unit to the other which may be attained by the clamping effect resulting from the production of the tubular part 37 and the conical part 38, and by securing the end 23 of rod 24 to the element 1 by means of the clamping screw 42, may be further improved by providing a circular weld 55 around rod 24 at the outer edge of the tubular part 37.

The supporting member or spacer 52 may be further improved in the manner shown in FIG. 14 by providing it with a plug 56 which is integrally connected thereto by a web 57 and adapted to seal the open end 58 of the element 1.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, I claim:

1. A joint structure comprising a tubular element with a first wall and an opposite second wall, said first wall having an aperture surrounded by an inwardly directed collar constituted by an inbent portion of said first wall, a rod extending transversely through said aperture into said tubular element and having an end proximal to said second wall, said rod being tightly embraced by said collar, securing means on said second wall engaging said end for holding said rod in place, and a rigid sleeve surrounding said collar and at least partially surrounding said rod while being wholly received in said element and bridging said walls.

2. A joint structure as defined in claim 1 wherein said end has a substantially frustoconical recess facing said second wall, the latter having an inbent portion forming complementarily frustoconical boss of annular shape engaging in said recess, said securing means comprising a screw lodged in said boss and axially threaded into said end, said screw having a head bearing from without onto said boss for maintaining same in firm contact with said recess.

3. A joint structure comprising a tubular element with a first wall and an opposite second wall, said first wall having an aperture surrounded by an inwardly directed collar constituted by an inbent portion of said first wall; a rod extending transversely through said aperture into said tubular element and having an end proximal to said second wall, said rod being tightly embraced by said collar; securing means on said second wall engaging said end for holding said rod in place, said end having a substantially frustoconical recess facing said second wall, the latter having an inbent portion forming complementarily frustoconical boss of annular shape engaging in said recess, said securing means comprising a screw lodged in said boss and axially threaded into said end, said screw having a head bearing from without onto said boss for maintaining same in firm contact with said recess; and a serrated frustoconical washer interposed between said recess and said boss under pressure from said screw.

4. A joint structure comprising a tubular element with a first wall and an opposite second wall, said first wall having an aperture surrounded by an inwardly directed collar constituted by an inbent portion of said first wall; a rod extending transversely through said aperture into said tubular element and having an end proximal to said second wall, said rod being tightly embraced by said collar; securing means on said second wall engaging said end for holding said rod in place; and a tubular spacer in said element coaxially surrounding said rod and said collar while bearing endwise upon said walls.

5. A joint structure as defined in claim 4 wherein said spacer has a stepped central bore with a small-diameter section gripping said rod at said end and with a large-diameter section embracing said collar.

6. A joint structure as defined in claim 5 wherein the small-diameter section of said bore is closed toward said second wall except for a hole of reduced diameter accommodating said securing means, thereby forming a socket for said end.

7. A joint structure as defined in claim 4 wherein said spacer has a substantially frustoconical recess facing said second wall, the latter having an inbent portion forming a complementarily frustoconical boss of annular shape engaging in said recess, said securing means comprising a screw lodged in said boss and axially threaded into said end, said screw having a head bearing from without onto said boss for maintaining same in firm contact with said recess.

8. A joint structure as defined in claim 6 wherein said spacer is axially divided into two interfitting parts respectively forming said small-diameter section and said large-diameter section, one of said parts defining said socket.

9. A joint structure as defined in claim 5 wherein said spacer is axially divided into two interfitting parts respectively forming said small-diameter section and said large-diameter section.

10. A joint structure as defined in claim 4 wherein said rod and said spacer are situated adjacent an open end of said tubular element.

11. A joint structure as defined in claim 10, further comprising a plug in said open end inegral with said spacer.

* * * * *